(12) United States Patent
Haimovitch (10) Patent No.: US 12,548,051 B2
(45) Date of Patent: *Feb. 10, 2026

(54) SOCIAL PRODUCT PROMOTION

(71) Applicant: Transform SR Brands LLC, Hoffman Estates, IL (US)

(72) Inventor: Guy Haimovitch, Kfar Saba (IL)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,326

(22) Filed: Jun. 20, 2024

(65) Prior Publication Data

US 2024/0346561 A1    Oct. 17, 2024

Related U.S. Application Data

(63) Continuation of application No. 18/153,472, filed on Jan. 12, 2023, now Pat. No. 12,056,748, which is a continuation of application No. 16/801,922, filed on Feb. 26, 2020, now Pat. No. 11,568,459, which is a continuation of application No. 14/815,524, filed on Jul. 31, 2015, now Pat. No. 10,580,050, which is a continuation of application No. 13/872,670, filed on Apr. 29, 2013, now abandoned.

(60) Provisional application No. 61/727,913, filed on Nov. 19, 2012, provisional application No. 61/641,329, filed on May 2, 2012.

(51) Int. Cl.
G06Q 30/0601 (2023.01)
G06Q 50/00 (2012.01)
H04L 67/02 (2022.01)

(52) U.S. Cl.
CPC ..... *G06Q 30/0605* (2013.01); *G06Q 30/0601* (2013.01); *G06Q 30/0603* (2013.01); *G06Q 30/0623* (2013.01); *G06Q 30/0631* (2013.01); *G06Q 30/0641* (2013.01); *G06Q 50/00* (2013.01); *G06Q 50/01* (2013.01); *H04L 67/02* (2013.01)

(58) Field of Classification Search
None
See application file for complete search history.

(56) References Cited

U.S. PATENT DOCUMENTS 5,960,411 A    9/1999  Hartman et al.
6,026,375 A    2/2000  Hall et al.
(Continued)

FOREIGN PATENT DOCUMENTS

WO    2004072762    8/2004
WO    2008014255    1/2008
(Continued)

OTHER PUBLICATIONS

Int'l Search Report and Written Opinion Appln No. PCT/US2013/053218, dated Dec. 11, 2013.
(Continued)

*Primary Examiner* — Lashonda Jacobs-Burton
(74) *Attorney, Agent, or Firm* — McAndrews, Held & Malloy, Ltd.

(57) ABSTRACT

Methods and apparatus are disclosed regarding an e-commerce system having social networking aspects. The e-commerce system leverages such social networking aspects to help promote the sale of products.

16 Claims, 8 Drawing Sheets

(56) References Cited

U.S. PATENT DOCUMENTS

| | | | |
|---|---|---|---|
| 6,697,865 B1* | 2/2004 | Howard | G06Q 30/02 707/999.009 |
| 6,880,750 B2 | 4/2005 | Pentel | |
| 7,756,756 B1* | 7/2010 | Lifson | G06Q 30/02 705/26.1 |
| 8,010,418 B1* | 8/2011 | Lee | G06Q 30/0631 705/26.7 |
| 8,095,432 B1* | 1/2012 | Berman | G06Q 30/0631 705/26.7 |
| 8,117,085 B1* | 2/2012 | Smith | G06Q 30/0629 705/26.7 |
| 8,200,550 B2 | 6/2012 | Altkins | |
| 8,355,955 B1 | 1/2013 | Mirchandani et al. | |
| 8,386,329 B1* | 2/2013 | Baughman | G06Q 30/0282 705/26.1 |
| 8,606,722 B2* | 12/2013 | Sarbaev | G06Q 30/06 709/204 |
| 2002/0111881 A1 | 8/2002 | Walker et al. | |
| 2002/0143655 A1 | 10/2002 | Elston et al. | |
| 2004/0204987 A1* | 10/2004 | Hill | G06Q 30/02 715/255 |
| 2004/0243485 A1* | 12/2004 | Borenstein | G06Q 30/02 705/26.61 |
| 2005/0197927 A1* | 9/2005 | Martineau | G06Q 30/0633 705/26.8 |
| 2006/0076397 A1 | 4/2006 | Langos | |
| 2006/0178943 A1 | 8/2006 | Rollinson et al. | |
| 2006/0282304 A1* | 12/2006 | Bedard | G06Q 30/02 705/7.29 |
| 2007/0088624 A1 | 4/2007 | Vaughn et al. | |
| 2007/0106468 A1 | 5/2007 | Eichenbaum et al. | |
| 2007/0138268 A1 | 6/2007 | Tuchman | |
| 2007/0257774 A1 | 11/2007 | Stumpert et al. | |
| 2008/0228600 A1 | 9/2008 | Treyz et al. | |
| 2009/0187488 A1 | 7/2009 | Shamilian | |
| 2009/0281903 A1 | 11/2009 | Blatstein | |
| 2010/0088148 A1 | 4/2010 | Presswala et al. | |
| 2010/0293106 A1 | 11/2010 | Rhoads et al. | |
| 2011/0130129 A1 | 6/2011 | Snyder et al. | |
| 2011/0131106 A1* | 6/2011 | Eberstadt | G06Q 30/02 705/26.1 |
| 2011/0184792 A1 | 7/2011 | Butcher et al. | |
| 2011/0184972 A1* | 7/2011 | Ard | G06F 16/26 707/769 |
| 2011/0258058 A1 | 10/2011 | Carroll et al. | |
| 2011/0282734 A1* | 11/2011 | Zurada | G06Q 30/02 705/14.49 |
| 2011/0320462 A1* | 12/2011 | Bao | G06F 16/9536 707/E17.005 |
| 2012/0109999 A1* | 5/2012 | Futty | G06Q 30/06 707/769 |
| 2012/0123837 A1* | 5/2012 | Wiesner | G06Q 30/0631 705/26.7 |
| 2012/0158477 A1* | 6/2012 | Tennenholtz | G06Q 30/0217 705/14.19 |
| 2012/0184363 A1 | 7/2012 | Barclay et al. | |
| 2012/0290448 A1* | 11/2012 | England | G06Q 30/0631 705/27.2 |
| 2013/0096966 A1 | 4/2013 | Barnes, Jr. | |
| 2013/0103494 A1* | 4/2013 | Leventhal | G06Q 30/0631 705/26.7 |
| 2013/0117151 A1 | 5/2013 | Macaisa et al. | |
| 2013/0151615 A1* | 6/2013 | Ho | G06Q 30/06 709/204 |
| 2013/0231990 A1* | 9/2013 | Munjal | G06Q 30/0613 705/14.23 |
| 2013/0268331 A1* | 10/2013 | Bitz | G06Q 30/0631 705/26.7 |
| 2013/0275219 A1* | 10/2013 | Alvin | G06Q 30/0603 705/14.58 |

FOREIGN PATENT DOCUMENTS

| | | | | |
|---|---|---|---|---|
| WO | 2011005072 | | 1/2011 | |
| WO | WO-2012044033 A2 * | 4/2012 | | G06Q 30/0282 |

OTHER PUBLICATIONS

What Drives Your Business. Remember to Ask for Them., Ed Keller, available at: https://www.forbes.com/sites/kellerfaygroup/2012/07/25/recommendations-are-what-drives-your-business-remember-to-ask-for-them/#5ge3bd3f39c6, Jul. 25, 2012. (Year: 2012).

Reading: Personal Selling (Year: 2010).

Refrence Selling (Year: 2007).

* cited by examiner

SOCIAL PRODUCT PROMOTION

RELATED APPLICATIONS

This application is a continuation of U.S. application Ser. No. 18/153,472, filed Jan. 12, 2023, which is a continuation of U.S. application Ser. No. 16/801,922, filed Feb. 26, 2020 (U.S. Pat. No. 11,568,459), which is a continuation of U.S. application Ser. No. 14/815,524, filed Jul. 31, 2015 (U.S. Pat. No. 10,580,050), which is a continuation of U.S. application Ser. No. 13/872,670, filed Apr. 29, 2013, which is a non-provisional application claiming priority of U.S. Provisional Application No. 61/727,913, filed Nov. 19, 2012, and U.S. Provisional Application No. 61/641,329, filed May 2, 2012. The documents above are incorporated herein by reference in their entirety.

FIELD OF THE INVENTION

Various embodiments relate to electronic commerce (e-commerce) and social networking, and more, particularly to product promotion in an e-commerce environment having social networking aspects.

BACKGROUND OF THE INVENTION

Electronic commerce (e-commerce) sites are an increasing popular venue for consumers to research and purchase products without physically visiting a conventional brick-and-mortar retail store. Similarly, social networking sites, such as Facebook and Google+, are an increasing popular venue for members to further grow and establish relationships with friends, family, and acquaintances. Given the success of such social networking sites, e-commerce sites have added features that integrate the e-commerce site with popular social networking sites and/or add social networking features to foster and grow a community on the e-commerce site itself. While such approaches have garnered various levels of success in the form of increased patronage and sales, incorporation of additional social networking features and further leveraging of social relationships in an e-commerce environment may drive even greater sales and customer loyalty.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

Apparatus and methods of promoting products in an e-commerce environment are substantially shown in and/or described in connection with at least one of the figures, and are set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention are related to e-commerce systems with social networking features. More specifically, certain embodiments of the present invention relate to apparatus and methods that leverage social networks to promote products.

Figure 1:
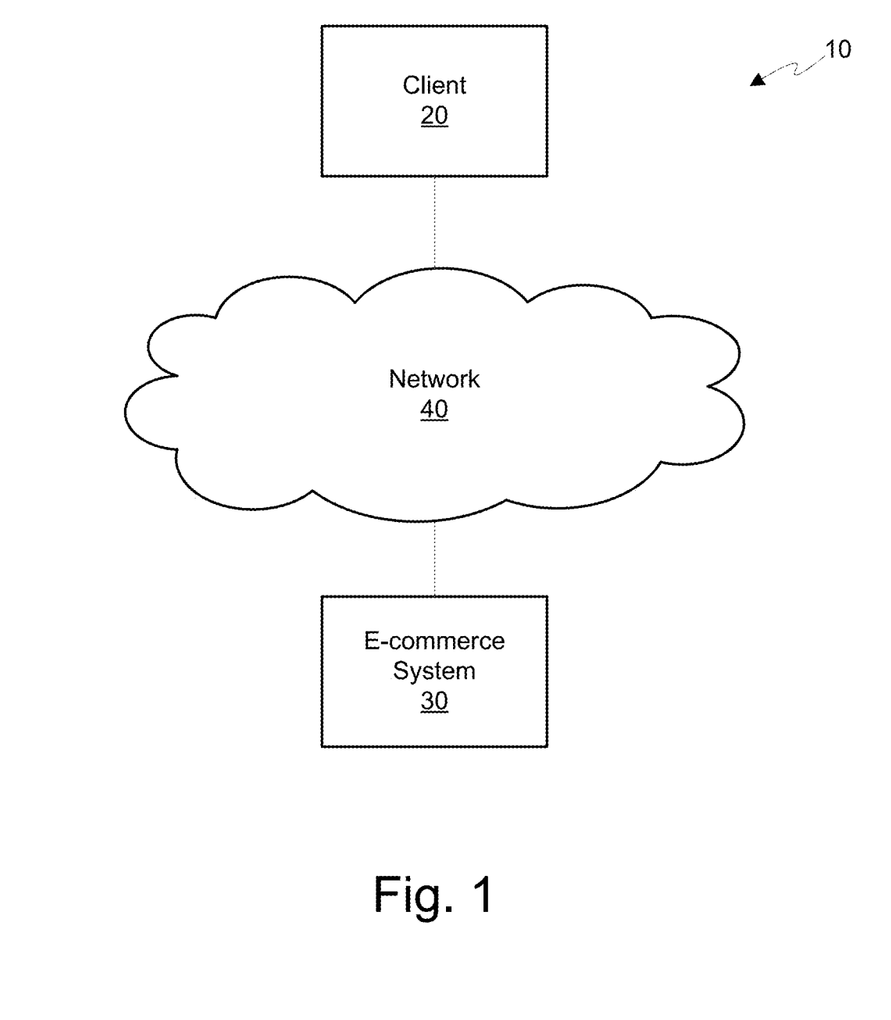
FIG. 1 shows an e-commerce environment comprising a client and an e-commerce system in accordance with an embodiment of the present invention.

Referring now to FIG. 1, a highly-simplified depiction of e-commerce environment 10 is provided. As shown, the e-commerce environment 10 may include a client 20 connected to an e-commerce system 30 via a network 40. The network 40 may include a number of private and/or public networks such as, for example, wireless and/or wired LAN networks, cellular networks, and the Internet that collectively provide a communication path and/or paths between the client 20 and the e-commerce system 30. The client 20 may include a desktop, a laptop, a tablet, a smart phone, and/or some other type of computing device which enables a user to communicate with the e-commerce system 30 via the network 40. The e-commerce system 30 may include one or more web servers, database servers, routers, load balancers, and/or other computing and/or networking devices that operate to provide an e-commerce experience for users that connect to the e-commerce system 30 via the client 20 and the network 40.

As noted above, the depicted e-commerce environment 10 is highly simplified. Those skilled in the art readily appreciate that the e-commerce environment 10 of FIG. 1 may be implemented in numerous different manners using a wide range of different computing devices, platforms, networks, etc. Moreover, those skilled in the art readily appreciate that while aspects of the e-commerce environment 10 may be implemented using a client/server architecture, aspects of the e-commerce may be implemented using a peer-to-peer architecture or another networking architecture.

Figure 2:
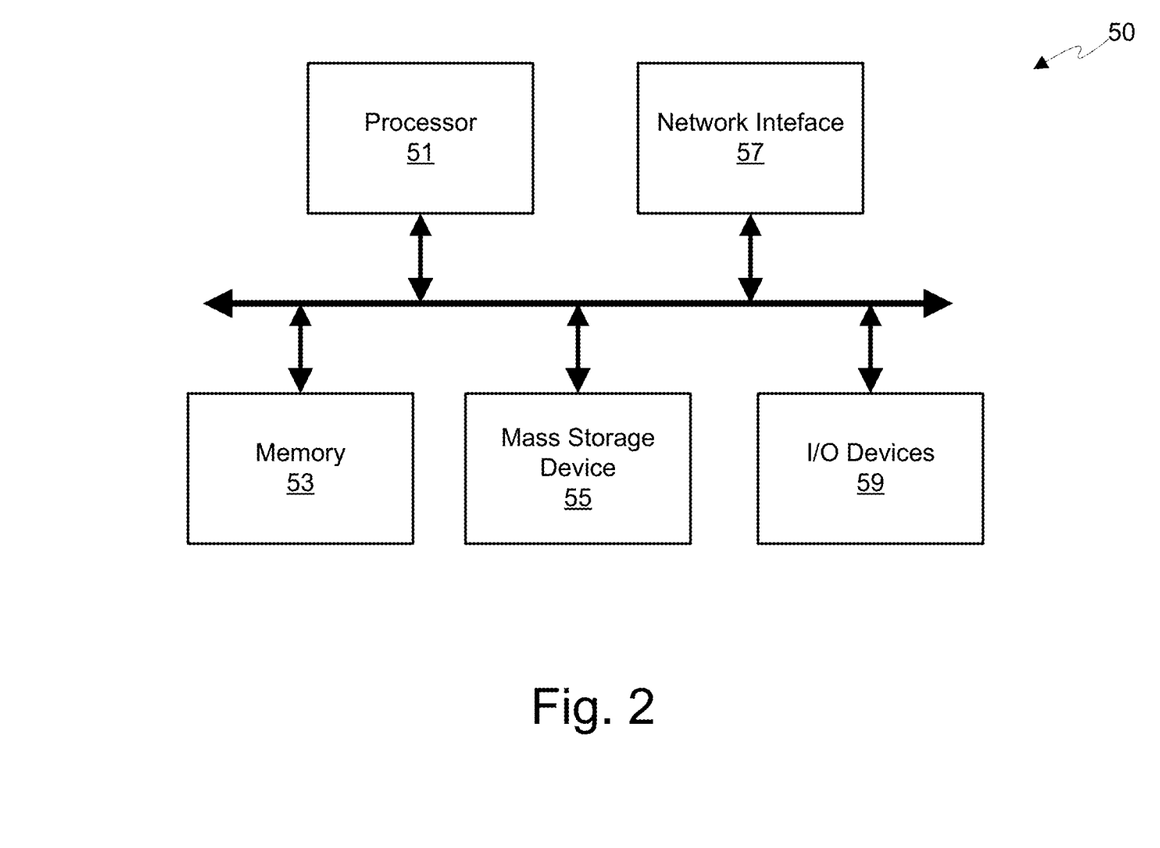
FIG. 2 shows a highly-simplified embodiment of a computing device for use in the e-commerce environment of FIG. 1.

As noted above, the client 20 and the e-commerce system 30 may include a computing device. FIG. 2 provides a highly-simplified depiction of a computing device 50 suitable for implementing a computing device of the client 20 and/or e-commerce system 30. As shown, the computing device 50 may include a processor 51, a memory 53, a mass storage device 55, a network interface 57, and various input/output (I/O) devices 59. The processor 51 may be configured to execute instructions, manipulate data and generally control operation of other components of the computing device 50 as a result of its execution. To this end, the processor 51 may include a general purpose processor such as an x86 processor or an ARM processor which are available from various vendors. However, the processor 51 may also be implemented using an application specific processor and/or other logic circuitry.

The memory 53 may store instructions and/or data to be executed and/or otherwise accessed by the processor 51. In some embodiments, the memory 53 may be completely and/or partially integrated with the processor 51.

In general, the mass storage device 55 may store software and/or firmware instructions which may be loaded in memory 53 and executed by processor 51. The mass storage device 55 may further store various types of data which the processor 51 may access, modify, and/otherwise manipulate in response to executing instructions from memory 53. To this end, the mass storage device 55 may comprise one or more redundant array of independent disks (RAID) devices, traditional hard disk drives (HDD), sold-state device (SSD) drives, flash memory devices, read only memory (ROM) devices, etc.

The network interface 57 may enable the computing device 50 to communicate with other computing devices via network 40. To this end, the networking interface 57 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc), and/or some other type of networking interface capable of providing a communications link between the computing device 50 and network 40 and/or another computing device.

Finally, the I/O devices 59 may generally provide devices which enable a user to interact with the computing device 50 by either receiving information from the computing device 50 and/or providing information to the computing device 50. For example, the I/O devices 59 may include display screens, keyboards, mice, touch screens, microphones, audio speakers, etc.

While the above provides some general aspects of a computing device 50, those skilled in the art readily appreciate that there may be significant variation in actual implementations of a computing device. For example, a smart phone implementation of a computing device generally uses vastly different components and may have a vastly different architecture than a database server implementation of a computing device. However, despite such differences, computing devices still generally include processors that execute software and/or firmware instructions in order to implement various functionality. As such, the above described aspects of the computing device 50 are not presented from a limiting standpoint but from a generally illustrative standpoint. The present application envisions that aspects of the present application will find utility across a vast array of different computing devices and the intention is not to limit the scope of the present application to a specific computing device and/or computing platform beyond any such limits that may be found in the appended claims.

Figure 3:
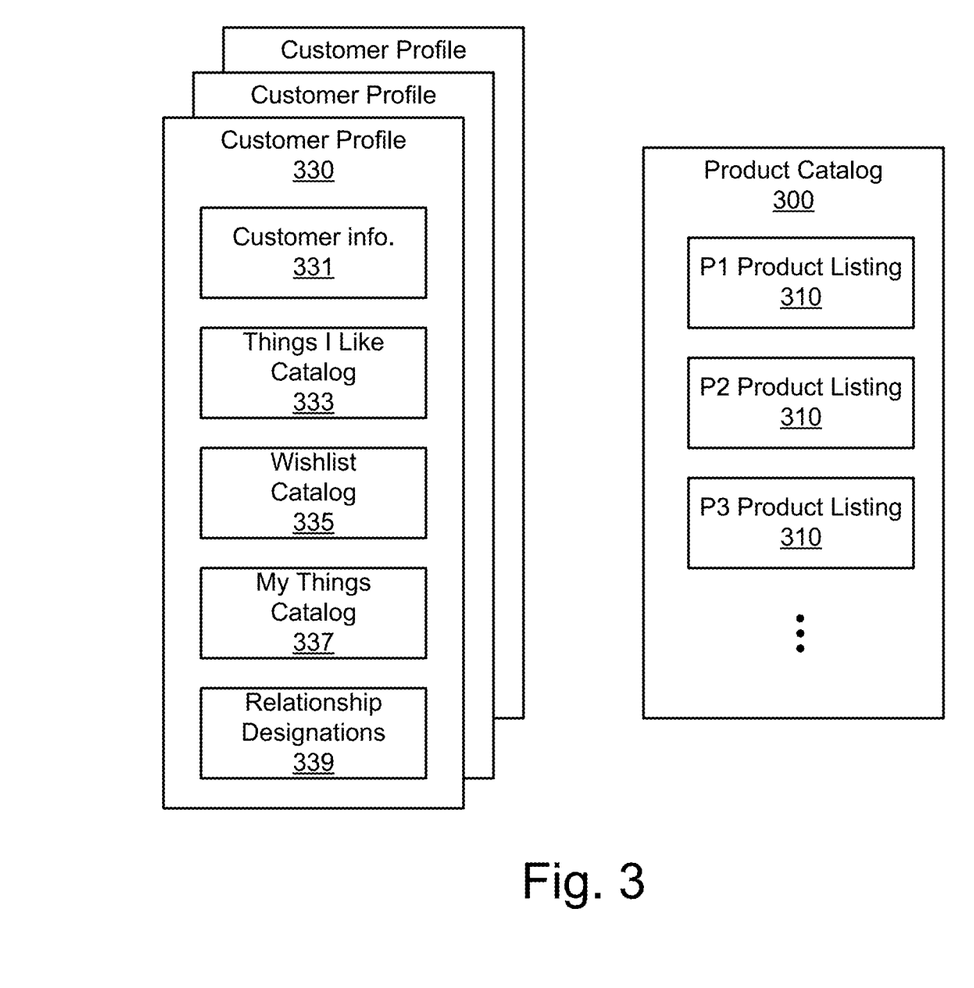
FIG. 3 shows user profiles and product catalogs maintained by an e-commerce system of FIG. 1.

As part of the provided e-commerce experience, the e-commerce system 30 may enable customers, which may be guests or members of the e-commerce system 30, to browse and/or otherwise locate products. The e-commerce system 30 may further enable such customers to purchase products offered for sale. To this end, the e-commerce system 30 maintains a product catalog or database 300. As shown in FIG. 3, the product catalog 300 includes product listings 310 for each product available for purchase. Each product listing 310 may include various information regarding the respective product, such as a unique product identifier (e.g., stock-keeping unit "SKU"), a product description, product image(s), manufacture information, available quantity, price, etc. Moreover, while the e-commerce system 30 may enable guests to purchase products without registering and/or otherwise signing-up for a membership, the e-commerce system 30 provides additional functionality to those users that become a member.

One additional feature the e-commerce system 30 provides to members is the ability to create a customer profile 330. As shown, a customer profile 330 may include personal information 331, personal catalogs 333, 335, 337, and relationship designations 339. The personal information 331 may include such items as name, mailing address, email address, phone number, billing information, clothing sizes, birthdates of friends and family, etc. which the e-commerce system 30 maintains in a private manner. The personal catalogs 333, 335, 337 may enable a member to assign various ownership, desirability, and/or other attributes to products in the product catalog 300. The e-commerce system 30 may further enable the member to assign relationship designations 339 to other members. For example, the e-commerce system 30 may permit a member to identify another member as a friend, buddy, co-worker, family member, or some other designation. The e-commerce system 30 may utilize such relationship designations 339 to control the amount of information shared between members. For example, the e-commerce system 30 may enable the member to share information (e.g., birth date, clothing sizes, name, email address, personal catalogs, etc.) with members having one designation but not with members having another designation. In particular, the member may share certain information with their "friends" and may share a subset of such information with general "members" of the e-commerce site.

Figure 4:
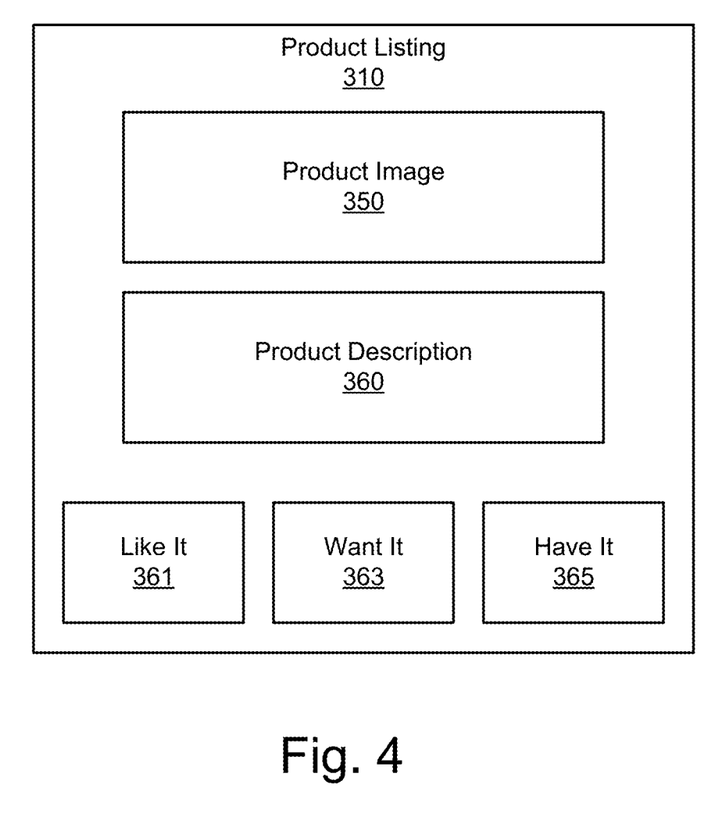
FIG. 4 shows an embodiment of a product listing provided by the e-commerce system of FIG. 1.

As noted above, the e-commerce system 30 permits members to assign attributes to products and create personal catalogs based on such assigned attributes. To this end, the e-commerce system 30 may cause a client 10 to display a product listing 310 as shown in FIG. 4. In particular, the e-commerce system 30 may provide such a product listing 310 in response to a member browsing products by type, price, kind, etc., viewing a list of products obtained from a product search, and/or other techniques supported by the e-commerce system 30 for locating products of interest. As shown, the product listing 310 may include one or more representative images 350 of the product as well as a product description 360. The product listing 310 may further include one or more attribute controls 361, 363, 365 which the member may activate (e.g., clicking via a mouse, touching a touch screen, etc.) in order to associate a particular attribute with the product. In one embodiment, the e-commerce system 30 may cause the client 20 to display a product listing 310 that includes a "Like It" control 361, a "Want It" control 363, and a "Have It" control 365.

By activating the "Like It" control 361, the member may cause the e-commerce system 30 to add the product to a "Things I Like" or "Like It" personal catalog 333 which maintains a listing of products which the member likes. Similarly, by activating the "Want It" control 363, the member may cause the e-commerce system 30 to add the product to a "Wishlist" or "Want It" personal catalog 335 which maintains a listing of products which the member wants to own. Furthermore, by activating the "Have It" control 365, the member may cause the e-commerce system 30 to add the product to a "My Things" or "Have It" personal catalog 337 which maintains a listing of products which the member owns.

Besides permitting a member the ability to add products to respective personal catalogs via a product listing, the e-commerce system 30 may further provide various manners by which the member may remove a product from a personal catalog. For example, the product listing 310 may display the controls 361, 363, 365 in a manner that indicates the respective attribute has already been assigned to the product. In particular, the product listing 310 may depict a depressed button, a checked box, etc associated with the respective attribute. In such embodiments, the member may remove a product from a personal catalog by simply reactivating the corresponding control 361, 363, 365 in the product listing 310. The e-commerce system 30 may further permit the member to browse their respective personal catalogs 333, 335, 337 in order to perform various management tasks such as removing products from the respective catalog. For example, the e-commerce system 30 via the client 20 may provide a product listing with a "Remove" control that enables the member to activate the control in order to remove the product from the respective catalog.

Figure 5:
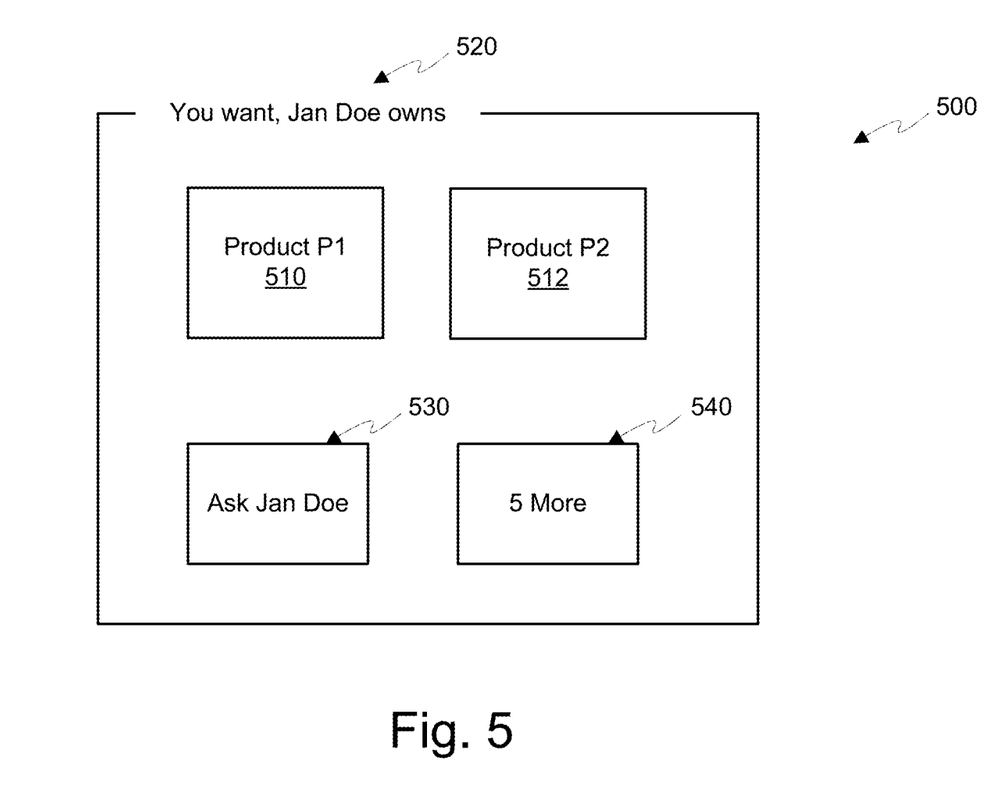
FIG. 5 shows a listing of products wanted by the requesting customer and owned by another customer of the e-commerce system of FIG. 1.

Thus, the e-commerce system 30 may enable members to create and maintain various personal catalogs of products with common attributes assigned by the member. In one embodiment, the e-commerce system 30 may leverage such personal catalogs of its members in order to help promote products. In particular, as shown in FIG. 5, the e-commerce system 30 via the client 20 may present a member with a listing 500 of products 510, 512 that the member wants to own and another member owns. Besides identifying the products that satisfy the relevant criteria, the listing 500 may further include a title 520 that conveys the depicted criteria or attributes of the displayed products 510, 512. For example, the listing of FIG. 5 indicates that the products 510, 512 are products that the member (e.g., "You") wants and that the other member (e.g., "Jan Doe") owns. The listing 500 may further include a Contact control 530 and a "More" control 540.

In one embodiment, the e-commerce system 30 may limit the listing 500 to a predetermined number (e.g., 4) of products to prevent presenting the member with too much information. The e-commerce system 30 may select the predetermined number of products based on various criteria such as popularity of the product, price of the product, availability of the product, promotions associated with the product, price reductions, and/or heuristically determined desirability of the product to the member. For example, the e-commerce system 30, based on various information maintained about the member, may calculate the likelihood of the member purchasing the product. Since the e-commerce system 30 may limit the number of products presented in the listing 500, the More control 540 provides the member with a way to view additional products that satisfy the attributes of the products in the listing 500. In particular, the More control 540 may further indicate the number of additional products which satisfy the attributes.

As noted above, the listing 500 may further include a Contact control 530. In one embodiment, the e-commerce system 30 may present the Contact control 530 in a manner that asks the member whether they want to ask the other member for information or other feedback about the product. The member may then activate the Contact control 530 in order to initiate communication and ask the other member (e.g., Jan Doe) for such information about one of the products 510, 512. Such communication may take many different forms. For example, the communication may be an e-mail message, an instant message, a comment placed in a timeline of home page, profile page, etc. of the other member. In this manner, the e-commerce system 30 provides a vehicle by which the member may obtain additional information regarding a product. In particular, the member may ask other members regarding their experience, opinion, etc. with product. Such feedback may greatly influence the member's decision to purchase the product for themselves especially if the other member is a family member, friend, or acquaintance for which they respect their opinion.

It should be appreciated that the e-commerce system 30 may provide the member with the listing 500 as a result of various browsing, research, and/or other usage of the e-commerce system 30. For example, the e-commerce system 30 may provide the listing 500 when the member requests the profile of another member. The e-commerce system 30 may also provide the listing 500 when the member views a page for a product that is in the member's "Wishlist" catalog 335 and that is in another member's "My Things" catalog 337. In such situations, the e-commerce system 30 may limit the search of "My Things" catalogs 337 to those members with which the member has specified a relationship (e.g., family member, friend, etc.). Feedback from such members is likely to have a greater influence on the member's purchasing decision than feedback from a stranger.

Figure 6:
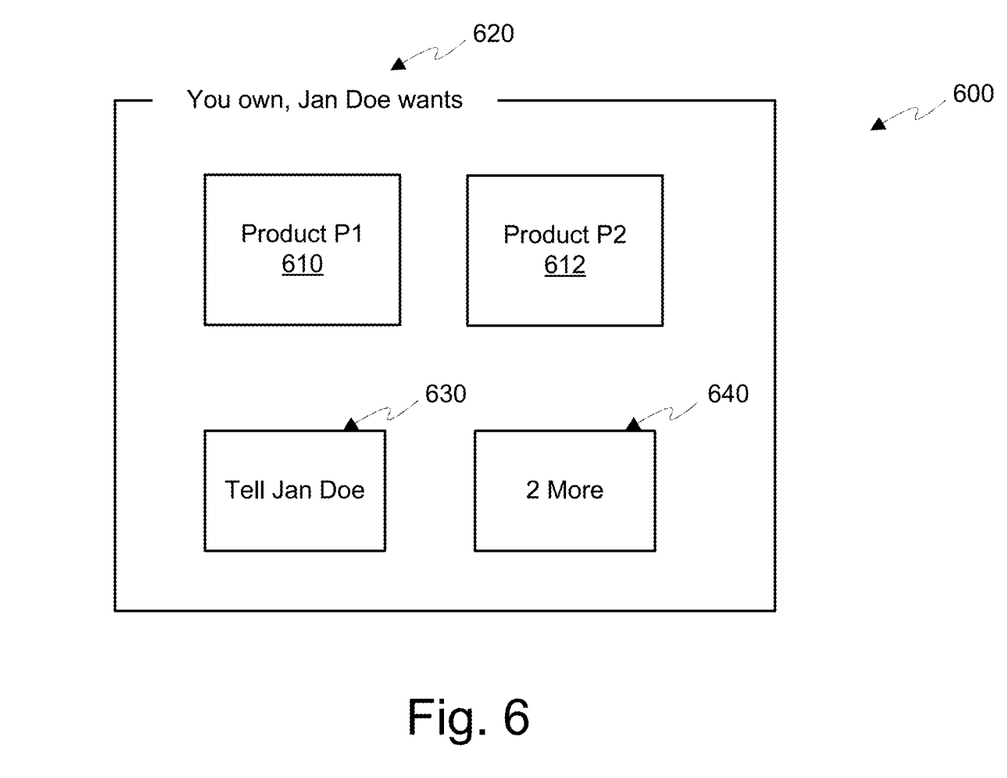
FIG. 6 shows a listing of products owned by the requesting customer and wanted by another customer of the e-commerce system of FIG. 1.

As shown in FIG. 6, the e-commerce system 30 via the client 20 may present a member with a listing 600 of products 610, 612 that the member owns and another member wants to own. Besides identifying the products that satisfy the relevant criteria, the listing 600 may further include a title 620 that conveys the depicted criteria or attributes of the displayed products 610, 612. For example, the listing of FIG. 6 indicates that the products 610, 612 are products that the member (e.g., "You") own and that the other member (e.g., "Jan Doe") wants to own. The listing 600 may further include a Contact control 630 and a More control 640. It should be appreciated that the e-commerce system 30 may implement listing 600 in a manner similar to listing 500. The main difference between listing 500 and listing 600 is that Contact control 530 results in the member requesting information about a product 510, 512 that the other member owns, whereas the Contact control 630 results in the member providing information about a product 610, 612 that the other member wants to own. To this end, the e-commerce system 30 may present the Contact control 630 such that the Contact control 630 requests the member to share information about a product 610, 612 with the other member.

Figure 7:
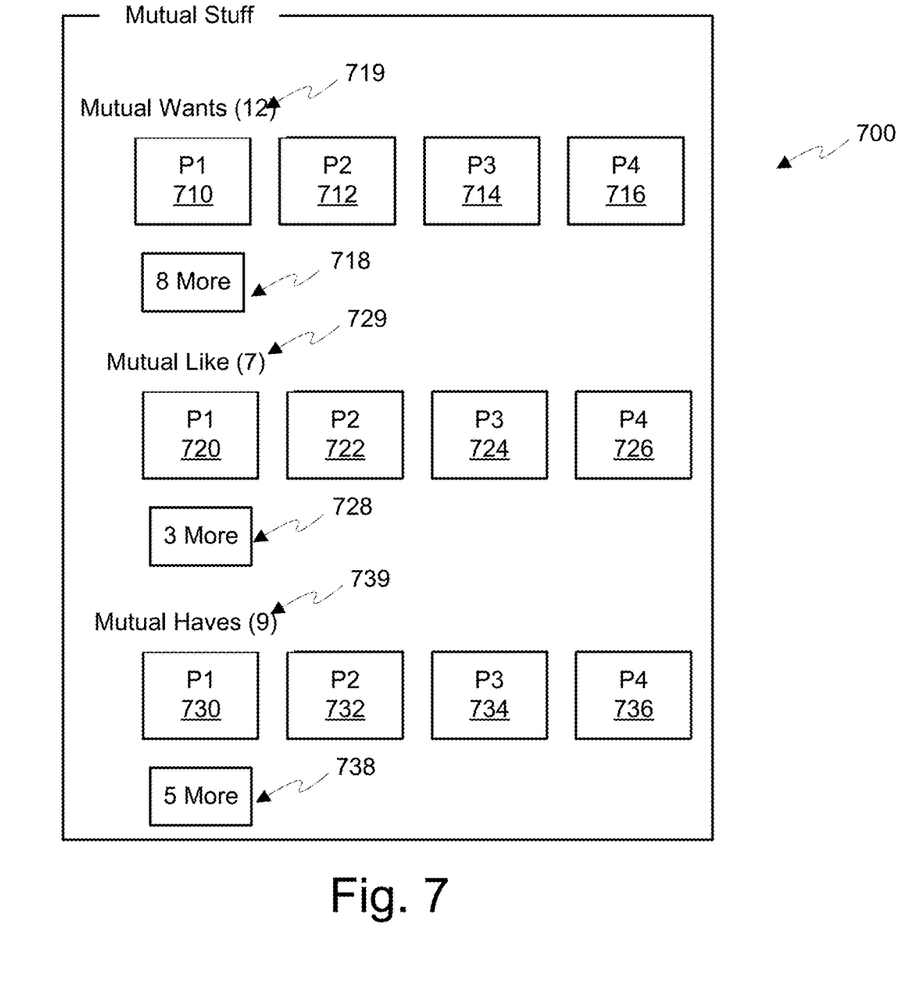
FIG. 7 shows a mutual listing of products that have the same attributes across two separate customers of the e-commerce system of FIG. 1.

The e-commerce system 30 via the client 20 may further provide a mutual listing or listings 700 based on personal catalogs as shown in FIG. 7. As shown, the mutual listing 700 may provide products mutually wanted, mutually liked, and mutually owned by two members. More specifically, the listing 700 may provide a subset of products 710, 712, 714, 716 that are mutually wanted by two members, the number 719 of products mutually wanted by both members, and a more control 718 that can be activated to show additional products mutually wanted by both members. As depicted, the more control 718 may provide an indication of the number of additional products that are mutually wanted by both members but not currently displayed. It should be appreciated that the e-commerce system 30 may generated such mutually wanted listing based on the "Wishlist" catalogs 335 for the two members. If the product is present in the "Wishlist" catalog 335 of two members, then both members want the product.

The e-commerce system 30 may generate the mutually liked and the mutually owned listings in a similar manner based on the "Things I Like" catalogs 333 and "My Things"

catalogs 337 of the two members. More specifically, the listing 700 may provide a subset of products 720, 722, 724, 726 that are mutually liked by two members, the number 729 of products mutually liked by both members, and a more control 728 that can be activated to show additional products mutually liked by both members. Similarly, the listing 700 may provide a subset of products 730, 732, 734, 736 that are mutually owned by two members, the number 739 of products mutually owned by both members, and a more control 738 that can be activated to show additional products mutually owned by both members.

It should be appreciated that the e-commerce system 30 may provide a member with the mutual listing(s) 700 as a result of various browsing, research, and/or other usage of the e-commerce system 30. For example, the e-commerce system 30 may provide the listing 700 when the member requests the profile of another member. The e-commerce system 30 may also provide the listing 700 when the member requests the e-commerce system 30 to locate a member with similar product preferences. Such a request may help the member to expand their social network to other members that share a similar view of products and thus provide another avenue for relevant feedback. Such identification of previously unknown members may be helpful to a member when none of their current contacts have experience with a product of interest.

Figure 8:
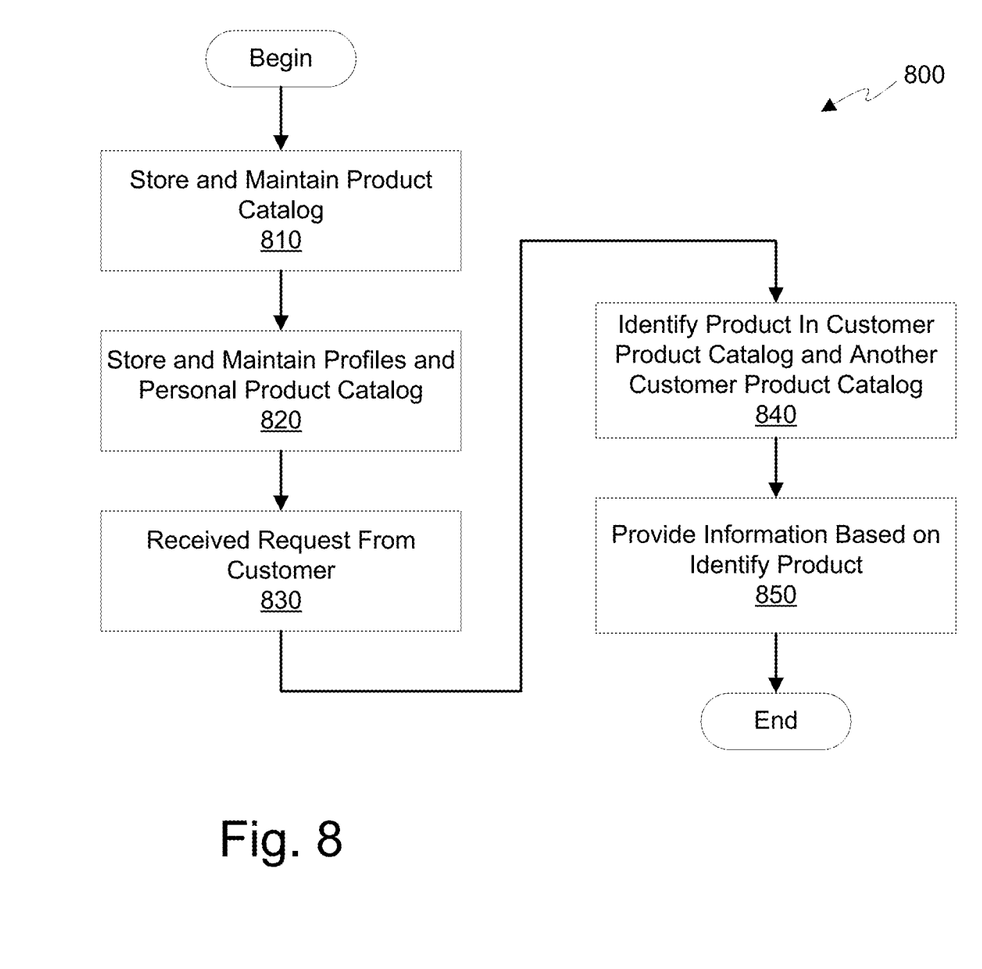
FIG. 8 shows a method of promoting products implemented by the e-commerce system of FIG. 1.

Referring now to FIG. 8, a flowchart of a method 800 of promoting products in an e-commerce environment having social networking aspects is shown. In particular, at block 810 a computing system such as e-commerce system 30 may store and maintain a catalog of products that are available for sale. Such catalog may be stored in one more mass storage devices 55 which may be associated with one more database servers. The catalog may include various information about the products for sale such as, for example, quantity available, price, product description, etc. At block 820, the e-commerce system 30 may store and maintain profiles 330 and personal catalogs 333, 335, 337 for customers/members of the e-commerce system 30. The e-commerce system 30 at block 830 may receive a request for information from a particular customer. In response to such request, the e-commerce system at block 840 may obtain the personal catalogs for the customer and identify based on personal catalogs for at least one other customer a product that is present in a personal catalog of the customer and the personal catalog of the other customer. As block 850, the e-commerce system 30 may provide the customer via client 20 information based upon the product identified as being present in personal catalogs of the two customers. In particular, the e-commerce system 30 may provide the client 20 with information for a product listing 500, a product listing 600, and/or a mutual listing 700.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible, computer readable storage medium such as, for example, flash memory devices, hard disk devices, compact disc media, DVD media, EEPROMs, etc. Such instructions, when executed by one or more computing devices, may enable result in the one or more computing devices promoting the sale of products and/or one or more of the other aspects of the e-commerce environment 10 described above.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A method, comprising:
   storing, in a storage device, one or more personal catalogs explicitly created and maintained by each customer of a plurality of customers, the personal catalogs comprising product listings designated by the respective customer based on a plurality of attributes relating to the respective customer's desire for a respective product; and
   via a processor:
   selecting a first customer and a second customer by identifying a product attribute in a personal catalog of the first customer that corresponds to the same product attribute in a personal catalog of the second customer; and
   initiating an electronic communication between the first customer and the second customer automatically in response to said correspondence, the communication being limited to customers having a stored personal relationship designation with the first customer.

2. The method of claim 1, comprising:
   storing a designation of personal relationships between the plurality of customers; and
   limiting the selection of the second customer to a subset of the plurality of customers having a personal relationship with the first customer.

3. The method of claim 1, wherein the electronic communication is initiated by directing an e-mail message to the second customer.

4. The method of claim 1, wherein the electronic communication is initiated by directing an instant message to the second customer.

5. The method of claim 1, wherein the electronic communication is initiated by placing a comment in a page associated with the second customer.

6. The method of claim 1, comprising;
   displaying information regarding each product in a catalog.

7. A system, comprising:
   a storage device configured to store one or more personal catalogs explicitly created and maintained by each customer of a plurality of customers, the personal catalogs comprising product listings designated by the respective customer based on a plurality of attributes relating to the respective customer's desire for a respective product; and
   a processor configured to:
   select a first customer and a second customer by identifying a product attribute in a personal catalog of the first customer that corresponds to the same product attribute in a personal catalog of the second customer, and initiate an electronic communication between a first customer and a second customer by identifying a product attribute in a personal catalog of the first customer that corresponds to the same product attribute in a personal catalog of the second customer.

8. The system of claim 7, wherein:

the storage device is configured to store a designation of personal relationships between the plurality of customers; and the processor is configured to limit the selection of the second customer to a subset of the plurality of customers having a personal relationship with the first customer.

9. The system of claim 7, wherein the electronic communication is initiated by directing an e-mail message to the second customer.

10. The system of claim 7, wherein the electronic communication is initiated by directing an instant message to the second customer.

11. The system of claim 7, wherein the electronic communication is initiated by placing a comment in a page associated with the second customer.

12. A non-transitory computer readable medium comprising a plurality of instructions that, when executed, cause a system to:

store one or more personal catalogs explicitly created and maintained by each customer of a plurality of customers, the personal catalogs comprising product listings designated by the respective customer based on a plurality of attributes relating to the respective customer's desire for a respective product;

select a first customer and a second customer by identifying a product attribute in a personal catalog of the first customer that corresponds to the same product attribute in a personal catalog of the second customer; and initiate an electronic communication between the first customer and the second customer automatically in response to said correspondence, the communication being limited to customers having a stored personal relationship designation with the first customer.

13. The non-transitory computer readable medium of claim 12, wherein:

a designation of personal relationships between the plurality of customers is stored, and the system is configured to limit the selection of the second customer to a subset of the plurality of customers having a personal relationship with the first customer.

14. The non-transitory computer readable medium of claim 12, wherein the electronic communication is initiated by directing an e-mail message to the second customer.

15. The non-transitory computer readable medium of claim 12, wherein the electronic communication is initiated by directing an instant message to the second customer.

16. The non-transitory computer readable medium of claim 12, wherein the electronic communication is initiated by placing a comment in a page associated with the second customer.

* * * * *